United States Patent [19]

Spector et al.

[11] 4,199,682

[45] Apr. 22, 1980

[54] FIRE AND EXPLOSION DETECTION APPARATUS

[75] Inventors: Dov Spector, Savion; Yechiel Spector, Zahala-Tel-Aviv, both of Israel

[73] Assignee: Spectronix Ltd., Tel-Aviv, Israel

[21] Appl. No.: 902,609

[22] Filed: May 3, 1978

[30] Foreign Application Priority Data

Feb. 27, 1978 [IL] Israel ........................................ 54137

[51] Int. Cl.[2] ............................ G01J 1/00; G01J 1/42

[52] U.S. Cl. .................................... 250/339; 250/342; 250/372

[58] Field of Search ............... 250/338, 339, 342, 349, 250/372; 324/72

[56] References Cited

U.S. PATENT DOCUMENTS

| | | | |
|---|---|---|---|
| 3,653,016 | 3/1972 | Cormier | 250/372 |
| 3,665,440 | 5/1972 | McMenamin | 250/372 |
| 3,825,754 | 7/1974 | Cinzori et al. | 250/339 |
| 3,931,521 | 1/1976 | Cinzori | 250/339 |

*Primary Examiner*—Alfred E. Smith
*Assistant Examiner*—Janice A. Howell
*Attorney, Agent, or Firm*—Ladas, Parry, Von Gehr, Goldsmith & Deschamps

[57] ABSTRACT

Fire and explosion detection apparatus comprises an ultra violet detector providing a first output signal in response to receipt of ultra violet radiation and an infra red detector providing a second output signal in response to receipt of infra red radiation. A logical AND circuit, in response to simultaneously occurring first and second output signals, provides a third output signal indicative of simultaneous receipt of ultra violet and infra red radiation.

5 Claims, 4 Drawing Figures

FIG. I

FIRE AND EXPLOSION DETECTION APPARATUS

BACKGROUND OF THE INVENTION

The present invention relates to detectors for automatically sensing the presence of a dangerous condition and energizing appropriate protective apparatus. Many types of detectors are known for sensing various dangers or potentially dangerous conditions. Pressure and temperature detectors are well known as are optical flame and smoke detectors. Fire detection by sensing emitted ultraviolet radiation is also well known.

In the design of such detectors and more particularly in the design of explosion detectors, two conflicting design criteria operate. The first is minimalization of the reaction time in which an output indication signal can be provided to protective apparatus and second is reliability in the presentation of false alarms. Particularly with respect to explosion protection the short reaction time is critical since remedial measures against most types of explosion must be taken within approximately 100 msec of the onset thereof in order to prevent serious damage to life and property. Reliability is also critical since such explosion detectors are often coupled to automatic explosion prevention apparatus and it is extremely desirable that such apparatus not be operated except in the case of actual need. An example of fire and explosion suppression apparatus suitable for use with detector apparatus of the type which form the subject matter of the present application is the apparatus described in our copending U.S. patent application Ser. No. 902,610 filed concurrently herewith and of common assignment herewith.

A number of fire and explosion detection system have been proposed.

Two relevant examples are illustrated in U.S. Pat. Nos. 3,825,754 and 3,931,521. U.S. Pat. No. 3,931,521 describes a dual spectrum infra-red fire detector which is activated by the coincident receipt of radiant energy in 7–30 micron spectral band and in 0.7–1.2 micron spectral band. The long wave length spectral band is detected by using a thermal detector such as a thermopile. The detector system described in U.S. Pat. No. 3,931,521 suffers from the disadvantage that the short wave length detector is responsive to light in the visible band which is transmitted through the atmosphere, and the long wavelength detector operates in a region of relatively high noise. Thus the device operates at a relatively low sensitivity threshold of operation.

U.S. Pat. No. 3,825,754 describes a dual spectrum infra-red fire detector similar to that described in U.S. Pat. No. 3,931,521 and also comprises a three channel infra-red radiation detection system for distinguishing between large explosive fires and large explosions which cause no fire. The system described in U.S. Pat. No. 3,825,754 shares the disadvantages of the system described in U.S. Pat. No. 3,931,521 as discussed hereinabove.

U.S. Pat. No. 3,665,440 shows a combination ultraviolet and infra-red detection system which provides an output only in the absence of ultra-violet radiation during the receipt of infra-red radiation. Such a detector system is not suitable for use in detecting incipient explosions.

U.S. Pat. No. 3,653,016 shows a combination infrared light detector and ultra-violet light detector coacting as a fire discrimination system. Since visible light is detected the false alarm rate of such a detector is increased when visible light is present in the detection environment.

SUMMARY OF THE INVENTION

The present invention seeks to overcome the various difficulties and disadvantages associated with the prior art detection apparatus.

There is thus provided in accordance with an embodiment of the invention fire and explosion detection apparatus comprising:

a first detector sensing radiation within a first frequency range excluding radiation in the visible spectrum and providing a first output indication in response to receipt of such radiation;

a second detector sensing radiation within a second frequency range excluding radiation in the visible spectrum and providing a second output indication in response to receipt of such radiation; and logic means for ANDing said first and second output indications and providing an output indication of simultaneous receipt of radiation within said first and second frequency ranges.

According to a preferred embodiment of the invention the first detector is a UV detector and the second detector is an IR detector.

Further in accordance with a preferred embodiment of the invention, said second detector operates in a wave length range within 1.5 to 3.0 microns.

Still further in accordance with a preferred embodiment of the invention, the second detector operates in a wave length range limited to 2.5–2.75 microns.

Additionally in accordance with an embodiment of the invention, signal processing means may be provided for substantially separating erroneous input signals to the logic circuitry from genuine alarm signals.

The invention will be more fully understood and appreciated from the following detailed description taken in conjunction with the drawings in which.

Figure 1:
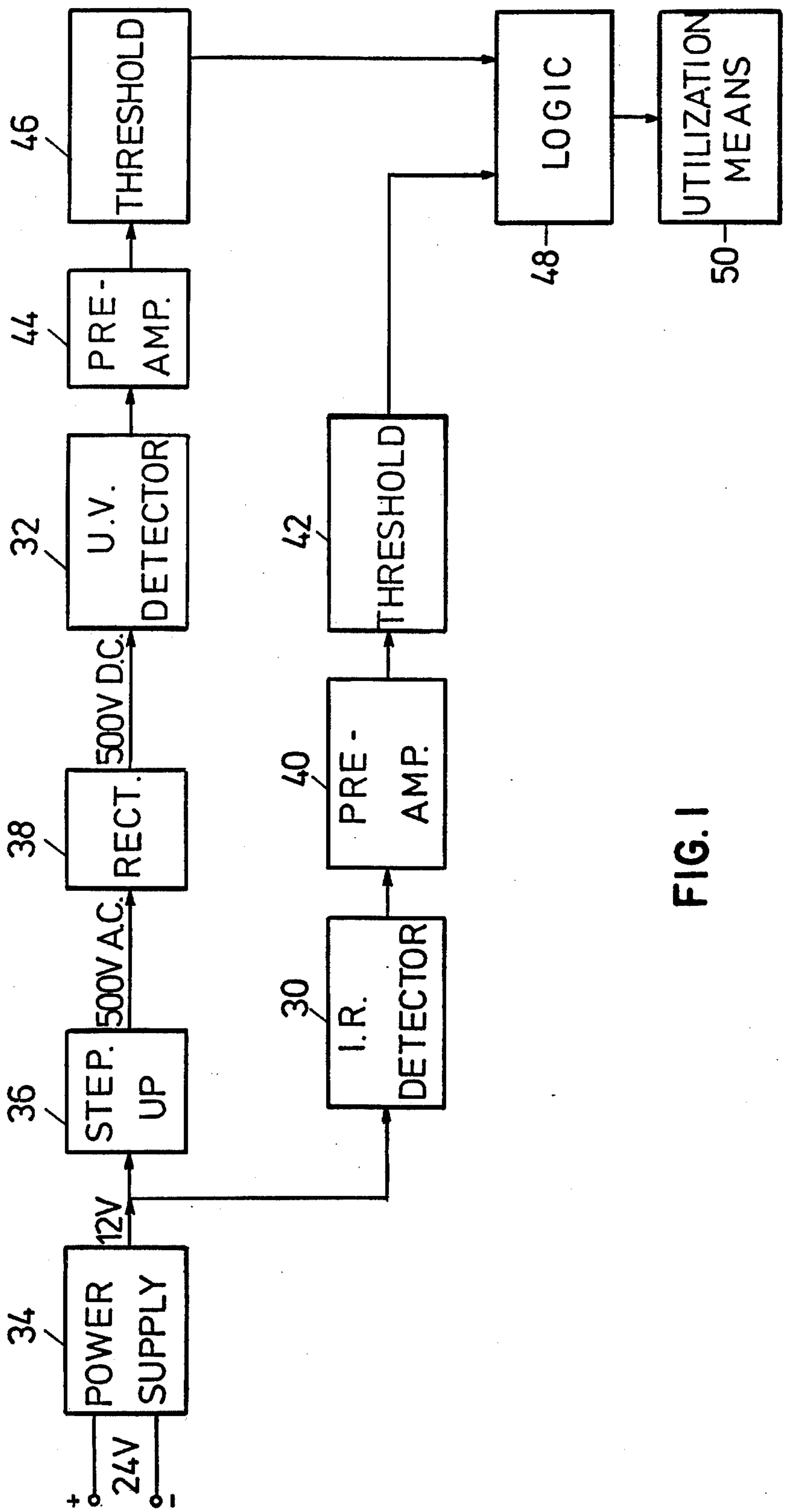
FIG. 1 is a block diagram of fire and explosion detection apparatus constructed and operative in accordance with an embodiment of the invention.

Referring now to FIG. 1 there is shown fire and explosion detection circuitry constructed and operative in accordance with an embodiment of the invention and comprising an infrared radiation detector 30 and an ultraviolet radiation detector 32. Infrared radiation detector 30 may be any suitable type of infrared detector operating in the wave length range of 1.5 to 3.0 microns and typically receives current from a 12 or 24 volt DC power supply 34. Such an infrared radiation detector is Model P398R manufactured by HAMAMATSU TV CO.

According to a preferred embodiment of the invention, the detection wave length range of infrared detector 30 is limited to the range of 2.5–2.75 microns. Radiation at these wavelengths is substantially absorbed by the earth's atmosphere, thus reducing the incidence of false alarms.

Ultraviolet detector 32 is typically a detector similar to that employed in a Edison Model 630, produced by the McGraw Edison Company of the U.S.A. and operates in a wave length range of up to 0.3 microns.

It is a particular feature of the present invention that both the IR detector 30 and the UV detector 32 operate exclusively outside of the range of visible light. As a result they may operate at relatively high sensitivity levels without encountering an unacceptable false alarm rate, as would occur were visible radiation sensed.

The output of infrared detector 30 is supplied to a preamplifier 40 and the amplified output thereof is supplied to threshold circuitry 42. Similarly, the output of ultraviolet radiation detector 32 is supplied to a preamplifier 44 whose amplified output is received by a threshold circuitry 46. The respective outputs of threshold circuitry 42 and 46 are supplied to logic circuitry 48 which may typically be an AND gate. The output indication supplied by logic circuitry 48 in the simultaneous presence of alarm indicating signals from threshold 42 and 46 is applied to utilization means 50 which may be alarm means or alternatively or additionally automatic explosion suppression apparatus such as referred to hereinabove.

Figure 2:
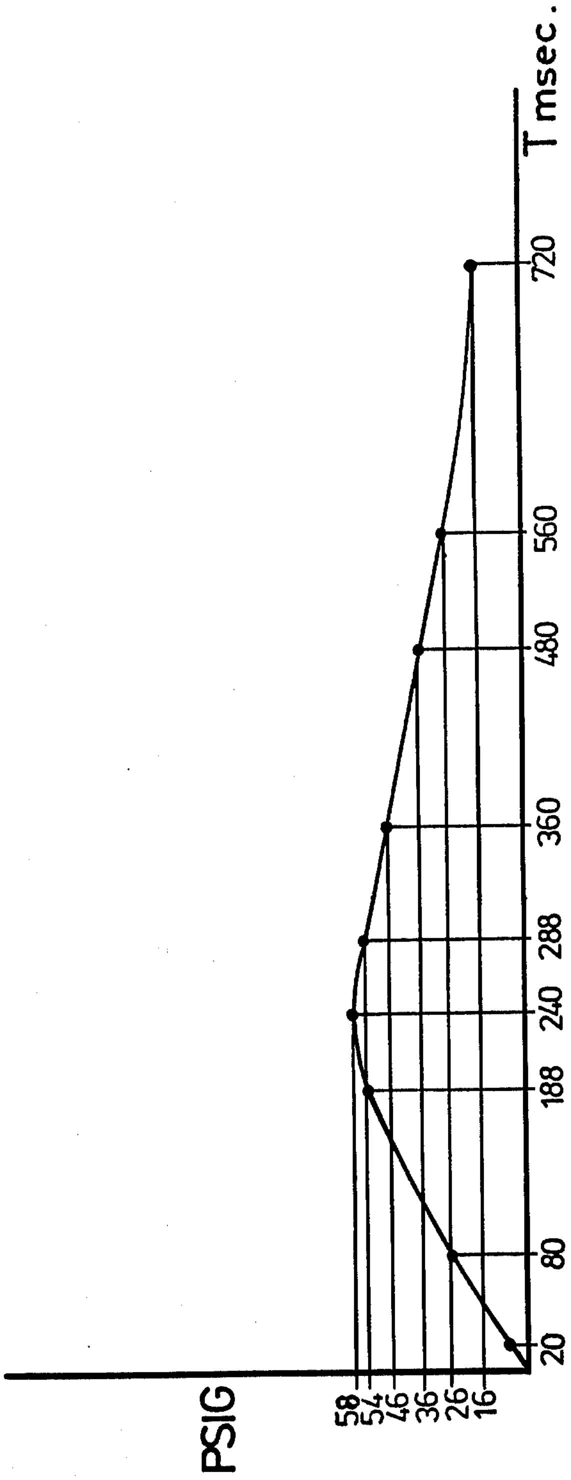
FIG. 2 is a plot of pressure versus time in an explosion situation.

The importance of quick reaction time in explosion detection may be appreciated from a consideration of FIG. 2 which shows the rise in pressure within an enclosure which is at least partially sealed as a function of time fillowing ignition of an explosive mixture. The plot of FIG. 2 begins approximately 40–120 msecs following ignition thus indicating that in a typical case pressure begins to be generated approximately 40–120 msecs. after ignition. It is appreciated that the precise configuration of the curve in FIG. 2 and the onset and peak of pressure build-up can vary as a function of the particular energy source ignited and the configuration of the surrounding enclosure.

From the typical case illustrated in FIG. 2 it is seen that the peak of the explosion occurs approximately 240 msecs. following the onset of pressure build-up. Thus, in order to suppress an explosion having the characteristics illustrated in FIG. 2 before its peak is approached it is necessary to detect initiation of an instant of ignition within 40–100 msecs. prior to pressure build-up and to achieve suppression within approximately 160 msecs. following detection.

The detection apparatus described hereinabove is eminently suitable for performance of this task. Taking for example the apparatus illustrated in FIG. 1, such apparatus has been experimentally constructed and tested and found to have a response time of less than 2 msecs. thus producing an output signal within 10 msecs. of penetration of a HEAT (High Energy Anti Tank) round into an armored vehicle.

Figure 3:
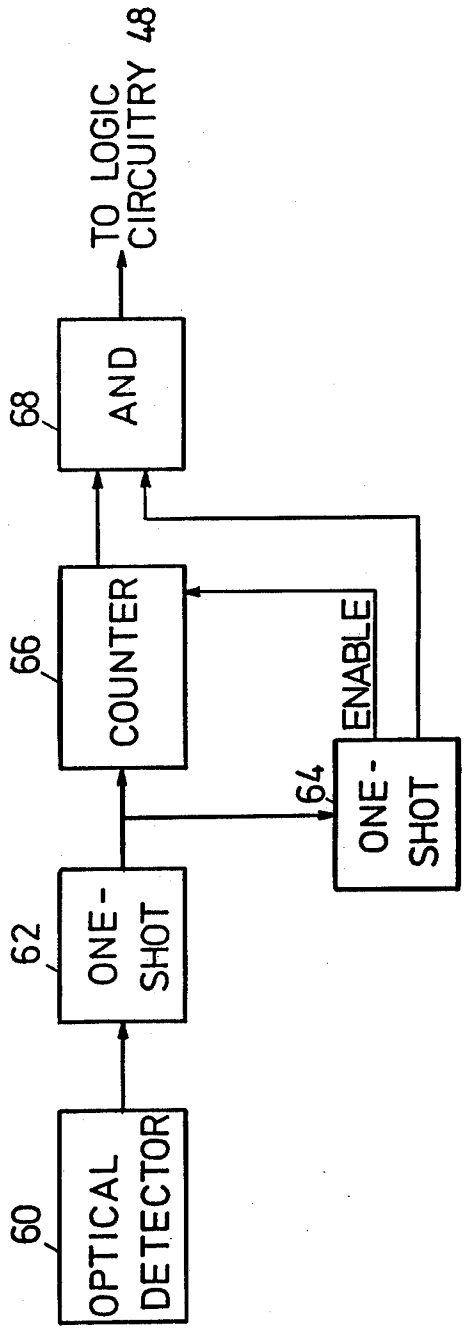
FIG. 3 is a block diagram of signal processing circuitry which may be employed in the apparatus of FIG. 1.

Referring now to FIG. 3 there is shown signal processing circuitry for the prevention of false alarms which may suitably be incorporated in the threshold detector circuitry employed in the embodiment of FIG. 1 or added to the apparatus shown therein as an additional element. The purpose of such signal processing circuitry is to distinguish between detection of spurious signals and detection of an alarm condition.

In the use of optical detectors such as a UV apparatus, a detector 60 supplies output signals to a one shot circuit 62 (monostable multivibrator) which converts each of the signals to a signal of uniform duration and amplitude. The output of one shot circuit 62 is supplied to the input of a counter 66 and to a second one shot circuit 64. One shot circuit 64 determines the counting time and provides an enable signal to counter 66 for a predetermined duration of time in response to the receipt of an output signal from one shot circuit 62. One shot circuit 64 is typically automatically reset so as to enable repeated clearing of the counter and resumption of counting.

Counter 66 is operative to count the uniform pulses received from one shot 62 for the duration of time determined by one shot circuit 64. If at the end of this duration a predetermined number of pulses, typically 5–10, have been counted, which number indicates the presence of an alarm condition, counter 66 supplies an output signal to an AND gate 68. AND gate 68 also receives an input from second one shot circuit 64 which indicates termination of the counting period. In the simultaneous presence of signals from counter 66 and second one shot 64, AND gate 68 produces an output signal to logic circuitry 48 indicating detection of an alarm condition.

Figure 4:
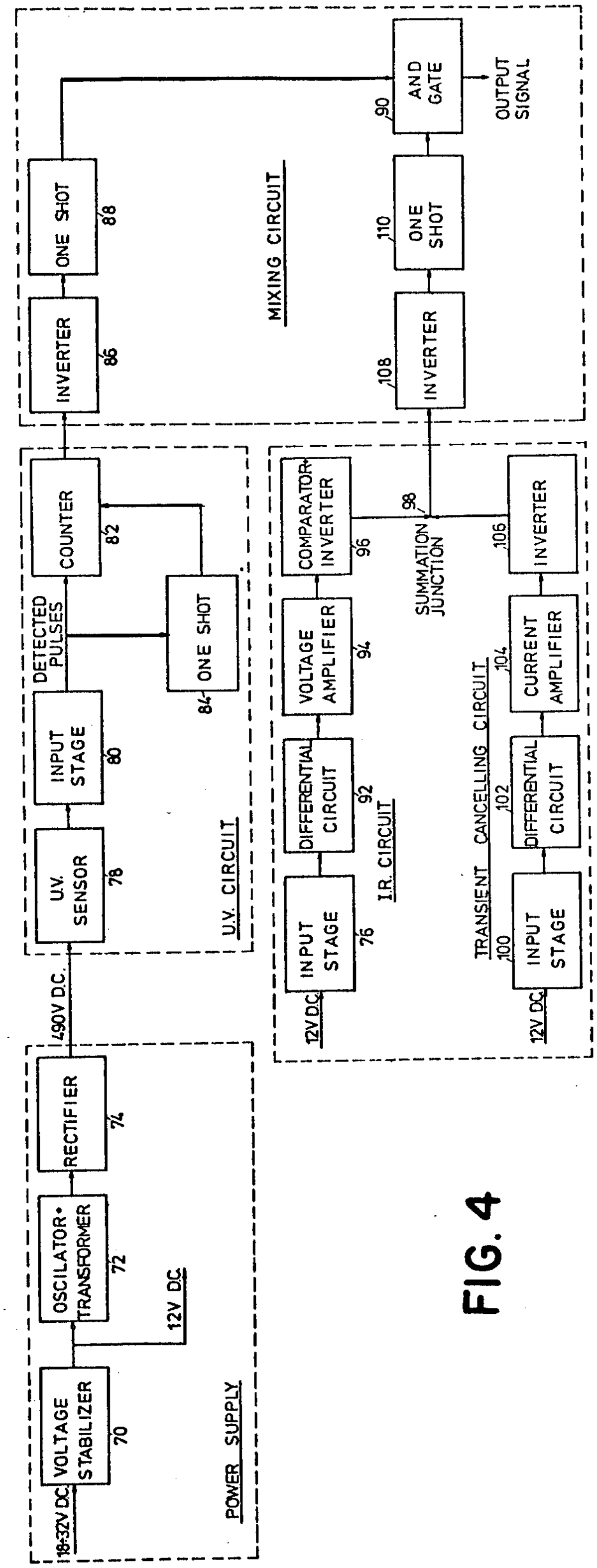
FIG. 4 is a block diagram of fire and explosion detection apparatus constructed and operative in accordance with another embodiment of the invention.

Referring now to FIG. 4 there is shown fire and explosion detection circuitry constructed and operative in accordance with another embodiment of the invention. The circuitry includes a power supply having a voltage stabilizer 70 which receives a d.c. input in the range from 18 V to 32 V and provides a stabilized d.c. output of 12 V which is fed to an oscillator and transformer circuit 72 for conversion to a stepped-up a.c. voltage which is then rectified by a rectifier 74 to produce a stabilized d.c. output of 490 V.

The 12 V output of stabilizer 70 is also fed to an input stage 76 of an I.R. CIRCUIT, while the 490 V output of rectifier 74 is fed to a U.V. sensor 78 of a U.V. CIRCUIT. An input stage 80 receives the output of U.V. sensor 78 and produces pulses in accordance with the detected ultra violet radiation, the detected pulses then being counted by a counter 82 which is reset by a monostable multivibrator (one shot) 84 triggered by the pulse output of input stage 80. The signal output of counter 82 is inverted by an inverter 86 and used to trigger a monostable multivibrator 88 whose output provides one of two inputs to an AND gate 90, the other input of which is received from the I.R. CIRCUIT in combination with a TRANSIENT CANCELLING CIRCUIT An input stage 100 of the TRANSIENT CANCELLING CIRCUIT is identical to input stage 76 and also receives the 12 V output of voltage stabilizer 70. The output of input stage 100 is differentiated in a differentiating circuit 102 and the differentiated signal is amplified in a current amplifier 104, then inverted in an inverter 106 and thereafter fed to the algebraic summation junction 98. The resulting signal from junction 98 is inverted in an inverter 108 which triggers a monostable multivibrator (one shot) 110 which supplies the other input to AND gate 90. Upon simultaneous receipt of signals from one shot 88 and one shot 110, indicative respectively of detection of ultra violet radiation and infrared radiation, AND gate 90 produces an output signal suitable for actuating an alarm means or alternatively or additionally an automatic explosion suppression apparatus such as referred to hereinabove.

It is appreciated that the circuitry illustrated herein is merely exemplary of a wide range of logic and detection circuitry which may be employed for detection in accordance with various embodiments of the invention. Therefore the invention is limited only by the claims which follow.

We claim:

1. Fire and explosion detection apparatus comprising:

a first detector for sensing radiation within a first frequency range excluding radiation in the visible spectrum and providing a first output indication in response to receipt of such radiation;

a second detector for sensing radiation within a second frequency range excluding radiation in the visible spectrum and providing a second output indication in response to receipt of such radiation; and logic means for ANDing said first and second output indications and providing a third output indication of simultaneous receipt of radiation within said first and second frequency ranges.

2. Fire and explosion detection apparatus according to claim 1, wherein said first detector is a UV detector and said second detector is an IR detector.

3. Fire and explosion detection apparatus according to claim 1, wherein said second detector operates in a wave length range of 1.5 to 3.0 microns.

4. Fire and explosion detection apparatus according to claim 3, wherein said second detector operates in a wave length range limited to 2.5–2.75 microns.

5. Fire and explosion detection apparatus according to claim 1, wherein said first detector operates in a wave length range of up to 0.3 microns approximately.

* * * * *